US010598016B2

United States Patent
Duijnhouwer et al.

(10) Patent No.: US 10,598,016 B2
(45) Date of Patent: Mar. 24, 2020

(54) COMBINATION OF TWO INTERCONNECTED SHAFTS FOR HIGH-SPEED ROTORS

(71) Applicant: Micro Turbine Technology, BV, Eindhoven (NL)

(72) Inventors: Frans Duijnhouwer, Eindhoven (NL); Paulus Maria Smeets, Tilburg (NL); Savad Shakariyants, Hertogenbosch (NL)

(73) Assignee: MICRO TURBINE TECHNOLOGY, BV, Eindhoven (NL)

( * ) Notice: Subject to any disclaimer, the term of this patent is extended or adjusted under 35 U.S.C. 154(b) by 0 days.

(21) Appl. No.: 15/896,002

(22) Filed: Feb. 13, 2018

(65) Prior Publication Data

US 2018/0179895 A1 Jun. 28, 2018

Related U.S. Application Data

(62) Division of application No. 14/411,830, filed as application No. PCT/NL2013/050465 on Jun. 27, 2013, now abandoned.

(30) Foreign Application Priority Data

Jun. 29, 2012 (NL) .................................... 2009090
Oct. 31, 2012 (NL) .................................... 2009734

(51) Int. Cl.
*F01D 5/02* (2006.01)
*F16D 1/02* (2006.01)

(52) U.S. Cl.
CPC ............... *F01D 5/026* (2013.01); *F16D 1/02* (2013.01); *F05D 2240/60* (2013.01); *Y10T 403/63* (2015.01)

(58) Field of Classification Search
CPC ........ F01D 5/026; F05D 2240/60; F16D 1/02; F16D 1/027; F16D 1/068;
(Continued)

(56) References Cited

U.S. PATENT DOCUMENTS

| 756,339 A | 4/1904 | Down |
| 4,719,074 A * | 1/1988 | Tsuno ..................... F01D 5/025 |
| | | 123/193.1 |

(Continued)

FOREIGN PATENT DOCUMENTS

| EP | 1 273 757 | 1/2003 |
| EP | 1 564 379 | 8/2005 |

(Continued)

OTHER PUBLICATIONS

"A Guide to Threadlocking Adhesives." Reliable Plant. Sep. 11, 2010, URL: https://web.archive.org/web/2010110902310/http://www.reliableplant.com/Read?27159/Guide-to-threadlocking.

*Primary Examiner* — Josh Skroupa
(74) *Attorney, Agent, or Firm* — Troutman Sanders LLP; Ryan Schneider

(57) ABSTRACT

A shaft joint has an inverse conical stopper. The joint is a combination of interconnected shafts, with one shaft being inserted into the other. The interface between the two shafts can be of any type: press-fit, thermally shrank, threaded, etc. Besides, the shaft-to-shaft interface can be also either bonded or non-bonded.

11 Claims, 6 Drawing Sheets

(58) Field of Classification Search
CPC .............. Y10T 403/4694; Y10T 403/63; Y10T 403/635; Y10T 403/7039
USPC ................................ 403/263, 333, 334, 361
See application file for complete search history.

(56) References Cited

U.S. PATENT DOCUMENTS

| | | | |
|---|---|---|---|
| 4,798,320 | A | 1/1989 | Fang |
| 4,886,695 | A | 12/1989 | Mizuno |
| 5,028,162 | A | 7/1991 | Tsuno |
| 6,037,687 | A | 3/2000 | Stewart |
| 6,499,958 | B2 | 12/2002 | Haugen et al. |
| 6,866,478 | B2 * | 3/2005 | Fabian .................... F01D 5/048 415/198.1 |
| 7,090,467 | B2 | 8/2006 | Jenks |
| 7,329,073 | B2 | 2/2008 | Jonsson et al. |
| 7,341,409 | B2 | 3/2008 | Jonsson |
| 7,568,896 | B2 * | 8/2009 | Dooley .................... F04D 3/02 415/110 |
| 2005/0127138 | A1 | 6/2005 | Bacon |
| 2006/0105296 | A1 | 5/2006 | Linder |
| 2009/0160282 | A1 | 6/2009 | Hayasaka |
| 2010/0272504 | A1 | 10/2010 | Sheth |
| 2011/0081212 | A1 | 4/2011 | Spichtinger |

FOREIGN PATENT DOCUMENTS

| | | |
|---|---|---|
| GB | 2 393 493 | 3/2004 |
| JP | H07 208477 | 8/1995 |

* cited by examiner

COMBINATION OF TWO INTERCONNECTED SHAFTS FOR HIGH-SPEED ROTORS

CROSS-REFERENCE TO RELATED APPLICATIONS

This application for a utility patent is a divisional application of a previously filed utility patent, still pending, having the application Ser. No. 14/411,830, filed 29 Dec. 2014, which claims priority to PCT/NL2013/050465, filed 27 Jun. 2013.

DESCRIPTION

Technical Field of the Invention

The invention relates to a combination of two interconnected shafts, of which one shaft has a hollow end part having a butt end with an end surface, and the other shaft has an end part with a reduced cross section that is inserted into the hollow end part and has a step between the end part and the rest of the shaft, which step has a surface that is in contact with the end surface of the butt end, wherein the inner surface of the hollow end part is connected to the outer surface of the end part with a reduced cross section by connection means and form a shaft-to-shaft interface.

Background of the Invention

Such a combination of two interconnected shafts is known from GB2393493A. High-speed rotors employ different shaft types, which can be solid and hollow with thin walls. Solid shafts are mechanically robust. Hollow shafts have low weight and inertia. Besides, they can accommodate inserts for various applications. One of such applications is permanent-magnet electrical machines. The rotor of such machines can be implemented as a hollow shaft with a permanent magnet placed inside. Such a hollow shaft can be typically referred to as a sleeve. The advantage of this design is the high ratio of magnet volume to shaft diameter. This is important for high-speed rotors, since a large diameter would result in more material stress and may have considerable windage losses.

The electrical machines can be used as motors and generators in: (micro-) gas turbines, electrically assisted turbochargers, energy storage systems, tooling, etc. Examples can be found in the following patents: U.S. Pat. Nos. 6,897,587 and 5,964,663.

Besides, rotor couplings may also employ shaft elements: hollow quill shafts, solid shafts, studs and others.

Depending on the design and application, different shaft types need to be joined together: solid and hollow. Often, hollow shafts need to be joined to solid rotor parts, segments and elements. These can be shaft elements belonging to bearing studs, tooling and machinery shafts, couplings, etc. Generator and motor shafts can be connected to:

Turbine and compressor shafts in gas turbines and electrically assisted turbochargers;
A flywheel shaft in energy storage devices; and
Shafts of expanders, compressors and other devices in other applications.

A joining method can be found in U.S. Pat. No. 6,841,912. Common joining methods are:

Permanent, such as brazing, welding and gluing; as well as
Non-permanent: via threads, for example.

These methods per se can be associated with a number of drawbacks, namely:

Welding and brazing require high temperatures that can be inapplicable in many applications.
Gluing and thread joining often cannot ensure integrity of joints under the action of high centrifugal loads.

SUMMARY OF THE INVENTION

It is an object of the invention to provide a combination of two interconnected shafts of the type defined in the opening paragraph, which is:

Suitable for application under high centrifugal loads; as well as
Self-centering and also pre-stressed to provide optimal load transmission and stiffness.

The combination of two interconnected shafts according to the invention is characterized in that the end surface of the butt end and the surface of the step are inclined towards the interface, wherein the end surface of the step has an inverse conical shape. This combination can be various shaft pairs: solid-to-solid, hollow-to-hollow and solid-to-hollow. The combination is particularly suitable between hollow thin-walled shafts (with or without inserts) and solid shafts. This combination is particularly suitable for high centrifugal loads and high rotation speeds.

The inclination is such that a first angle between the end surface of the butt end and the inner surface of the hollow end part and a second angle between de surface of the step and the outer surface of the end part are equal to each other and are smaller than 90 degrees.

The contact surface between the shafts may have any type of surface: cylindrical, conical or other. The connection between the shafts can be of any type: press-fit, thermally shrank, threaded, equipped with a bayonet lock, etc.

The connection can be also either bonded or non-bonded. The bonding method can be gluing, brazing, application of a thread-lock substance and any other alternative methods.

The combination of two interconnected shafts is suitable for high-speed rotors and particularly advantageous for high-speed motors and generators.

Working Principle

Different shafts many have thin walls or have thin-walled sections: It can be simply the thin wall of a hollow shaft (of either variable or constant wall thickness). It can be also the thin wall of a hollow section (or part) of any shaft type. Another shaft can be inserted into this hollow section (part).

The centrifugal load in any thin-walled shaft (section or part) can only be balanced with "hoop" stresses. High hoop stresses cause a large strain in the material. As a consequence, the shaft will have a tendency to "swell" radially at high rotation speeds.

The high hoop stress and therefore the radial swelling can be prevented if the hollow shaft is supported radially on the inner side. Furthermore, the load on this radial support would be much smaller than the hoop stress.

In a joint (i.e. combination of interconnected shafts), the radial support for thin walls can be provided by a solid element: either a solid insert (in a hollow shaft) or a solid shaft, thread stud, etc. The interface (i.e. connection surface) between the thin wall and the solid element can be structurally enhanced by bonding.

Bonding would have to transmit radial load from the thin wall to the solid element. This radial load is much smaller compared to hoop stresses. However, as the surface area for bonding is relatively large and the gap between the shaft walls and the solid element is small, even a relatively weak and soft bonding can be applied. This bonding can be gluing, application of a thread-lock substance or any other alternative method.

Special care is required at the start and end of the bonded connection. At these locations, there are abrupt changes in geometry and stiffness. Without special provisions, these changes locally cause large strains in the bond and could result in local failure of the bond. As local failure of the bond would not relieve the load, the entire joint interface will continue failing.

The Inverse Conical Stopper according to the invention prevents both:
Swelling of the shaft wall; and
Failure of the joint interface.
This is done by:
Reducing loads on the interface by applying a pre-stress to (partly) compensate for the centrifugal load on the shaft wall at high rotation speeds; and
Mechanically locking radial swelling of the free end of the thin wall at high rotation speeds.
The Inverse Conical Stopper also:
Enforces concentric alignment of the two shaft elements; and
Pre-stresses the joint interface to attain a tight joint.

BRIEF DESCRIPTION OF THE DRAWINGS

The invention will be further elucidated below using figures.

DETAILED DESCRIPTION OF THE DRAWINGS

Figure 1:
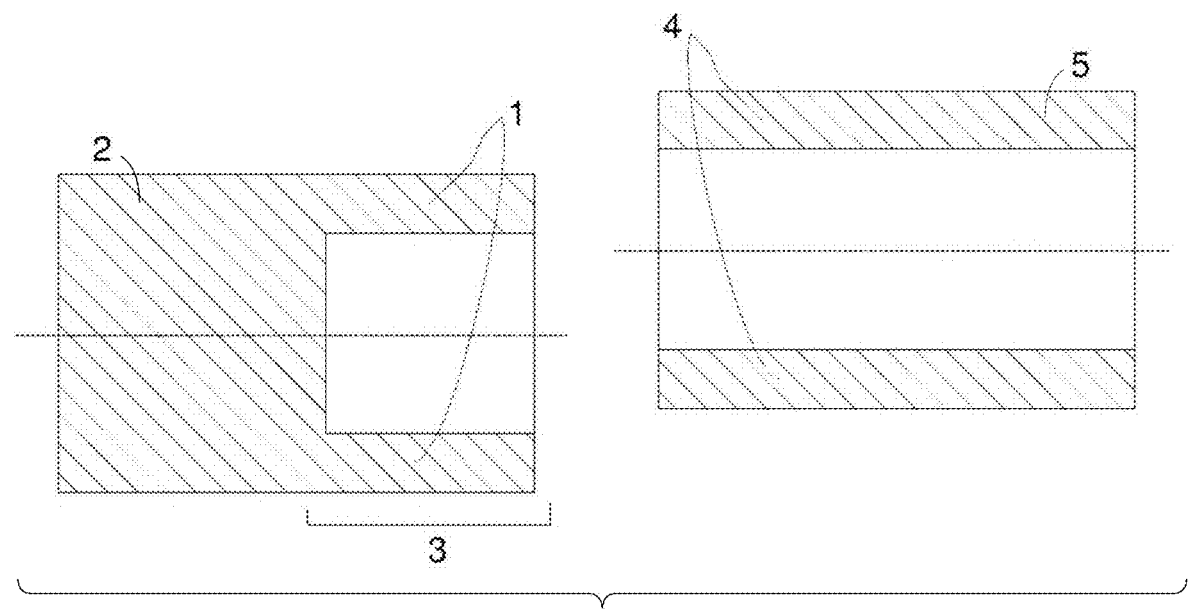
FIG. 1 shows shafts with thin walls

Thin walls in shafts are shown in FIG. 1. The numeral 1 points at a thin wall in the section (or part) 3 of a solid shaft 2. This section may serve different purposes. For example, another shaft may be inserted into this section to form a shaft-to-shaft joint (i.e. combination of shafts). Another random shaft is referred to by the numeral 5 in FIG. 1. The thin wall of this shaft is 4. This is a hollow shaft. Any of the shafts in FIG. 1 can have either variable or constant wall thickness. The shafts may also be of any cross section. Each shaft may or may not have inserts.

Figure 2:
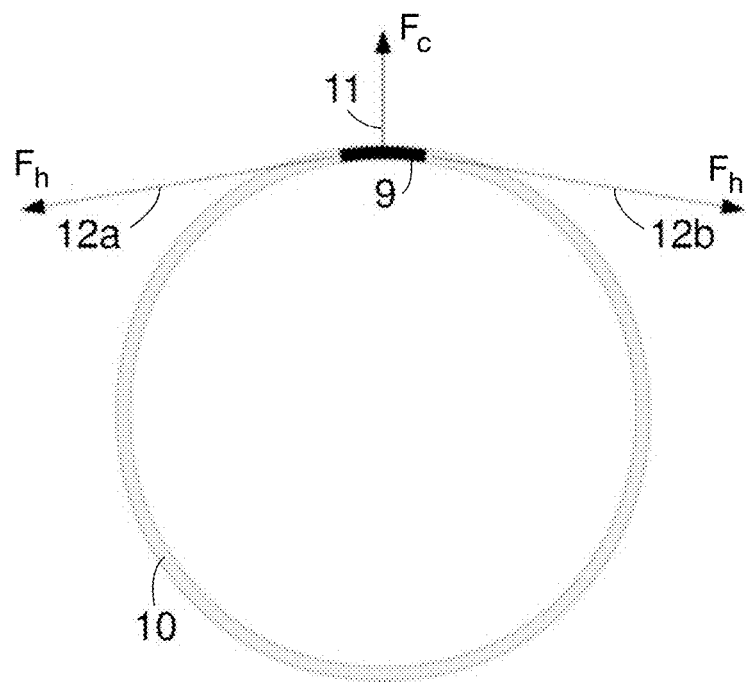
FIG. 2 shows load balance on a thin-walled shaft segment.

FIG. 2 shows load balance on a small segment 9 of a thin-walled shaft 10 or shaft section. The centrifugal load 11 due to rotation is directed outwards. The thin wall can only balance this load with hoop stresses 12a and 12b. At high rotation speeds, both the centrifugal and the hoop stress are accordingly high. This causes large strains in the material. As a consequence, the shaft wall 10 has a tendency to "swell" radially.

Figure 3:
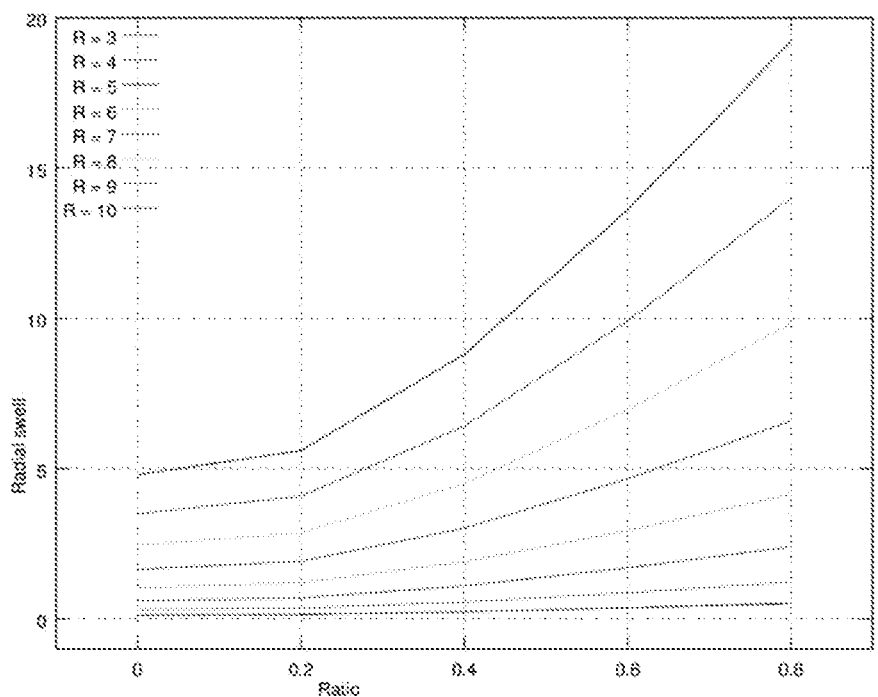
FIG. 3 shows radial swelling of steel shafts with circular tube cross-sections at 240,000 rpm as a function of inner-to-outer diameter ratio.

FIG. 3 relates to steel shafts with different radii (R=3 . . . 10 mm), rotating at 240,000 rpm. At this speed a hollow steel shaft of 16.0 mm outer and 12.8 mm inner diameter (ratio inner/outer=0.8), will swell 15 micron more in diameter than a 16 mm solid steel shaft.

Figure 4:
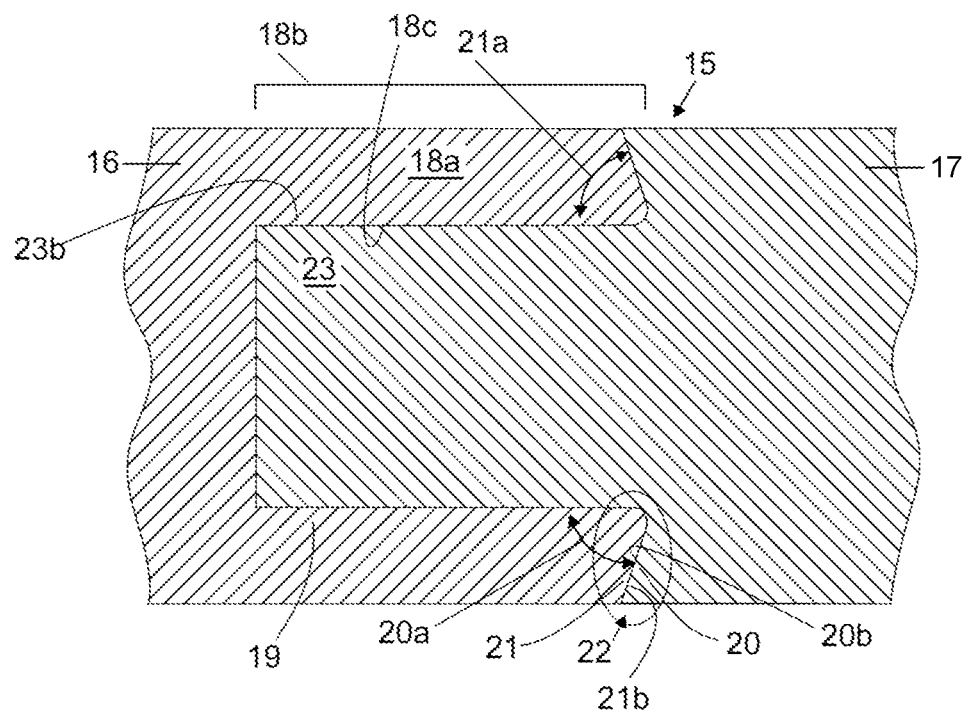
FIG. 4 shows a basic combination of shafts with an Inverse Conical Stopper.

FIG. 4 shows the basic embodiment of a combination 15 of two interconnected shafts 16 and 17 according to the invention. At least one shaft 16 has a thin wall 18a in, at least, a certain section 18b. This section 18b forms a hollow end part of the shaft 16. The end part of the second shaft 17 has a reduced cross section 23. This end part 23 is inserted into the hollow end part 18b. The thin-walled section 18b of the shaft 16 and the inserted section 23 of the shaft 17 form a shaft-to-shaft interface 19. The shaft 17 has a step 20. The surface of this step 20 is in contact with the end surface of the butt end 21 of the thin-walled section 18b. The surfaces 20-21 are inclined towards the interface 19 and form an Inverse Conical Stopper 22. That is also to say, the surfaces 20 and 21 are inclined towards the center lines of the shafts 16 and 17. The inclination is such that a first angle 21a between the end surface 21b of the butt end 21 and the inner surface 18c of the hollow end part 18b and a second angle (20a) between de surface 20b of the step 20 and the outer surface 23b of the end part 23 are equal to each other and are smaller than 90 degrees, preferably about 70 degrees.

The Inverse Conical Stopper 22 serves several purposes:
Preventing swelling of the thin wall 18a;
Enforcing concentric alignment of the two shafts: 16 and 17;
Pre-stressing the shaft-to-shaft interface 19 to attain a tight joint; and
Mechanically locking radial swelling of the thin-walled section 18b at high centrifugal loads and high rotation speeds.

The surfaces 20 and 21 of the Inverse Conical Stopper 22 can be of various types. They can be flat and referred to as faces. They can be also non-flat or curved. They can also contain third features, such as dimples, bumps, notches or others. These surfaces may or may not have various patterns, such as striations, herring-bone or others. The surfaces 20 and 21 can be both smooth and rough.

Each of the shafts 16 and 17 can be either solid or hollow. Each hollow shaft may or may not have an insert.

The shaft-to-shaft interface 19 can be also of any type, including: press-fit, thermally shrank, threaded, equipped with a bayonet lock, etc. Besides, the interface 19 can be also either bonded or non-bonded.

That is to say, the inner surface of the hollow end part 18b is connected to the outer surface of the end part with a reduced cross section 23 by connection means. These connection means can be of any type. The surface of the connection means can be also of any type, including: cylindrical, conical or other. In the other words, the staft-to-shaft interface may have any type of surface.

If the interface 19 is bonded, the Inverse Conical Stopper 22 also prevents bond failure by: Reducing loads on the bond by using a pre-stress to (partly) compensate for the centrifugal load on the thin wall 18a.

The Inverse Conical Stopper 22 makes the joint 15 particularly suitable for high centrifugal loads and high rotation speeds.

The bonding method for the interface 19 can be gluing, brazing, application of a thread-lock substance and any other alternative method. Bonding may also be applied to the surfaces 20 and 21 of the Inverse Conical Stopper 22.

Figure 5:
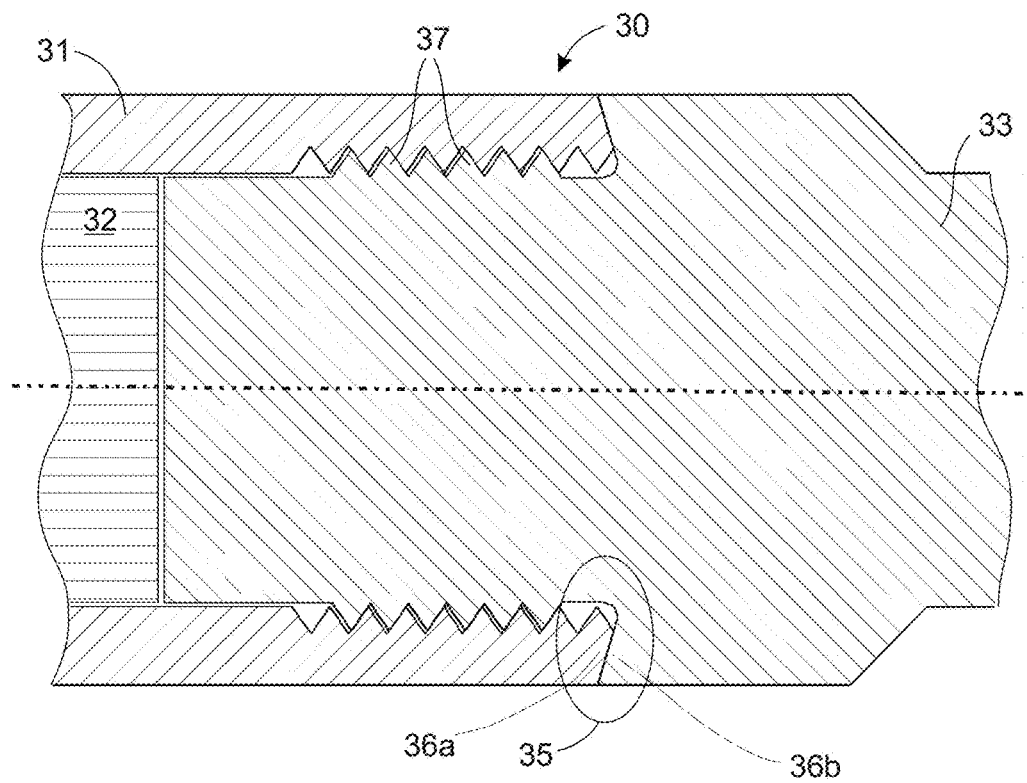
FIG. 5 shows a bonded-threaded combination for high-speed rotor shafts with a bonded stiff insert.

FIG. 5 shows the embodiment of a bonded-threaded joint 30 according to the invention for high-speed rotors. Herein, the joint 30 is between a hollow shaft 31 with a bonded stiff (and strong) insert 32 and a solid shaft 33. The thread 37 is applied to the hollow 31 and solid 33 shafts. Bonding is applied to this thread 37.

The bonding that is applied between the insert 32 and the hollow shaft 31 both fixates the insert 32 and prevents the hollow shaft 31 from swelling at high rotation speeds. As the insert 32 is stiff, it provides a balance for the centrifugal load on the hollow shaft. The same balance is provided by the threaded part of the solid shaft 33. This means that no special provisions to protect the bond are necessary at the end of the solid shaft thread. Only the area at the end of the hollow shaft needs extra provisions.

The bonded-threaded joint has the Inverse Conical Stopper according to the invention designated by the numeral 35. This Inverse Conical Stopper 35 is formed by inclined faces 36a and 36b on the hollow and solid shafts accordingly. The conical face 36a is at the butt end of the hollow shaft 31 within the joint. The conical face 36b is the mating face for the face 36a belonging to the solid shaft 33. The faces 36a and 36b are inclined towards the thread between the hollow 31 and solid 33 shafts.

In other embodiments of the bonded-threaded joint 30 in FIG. 5:

The bonding applied to the thread 37 is gluing.
The bonding applied to the thread 37 is brazing.
The bonding applied to the thread 37 is via a thread-lock substance.
Other bonding methods can be also applied to the thread 37.

In yet other embodiments:

The bonding applied to the insert 32 is gluing.
The bonding applied to the insert 32 is brazing.
Bonding of the stiff insert 32 into the hollow shaft 31 can be also made by other methods.

Figure 6:
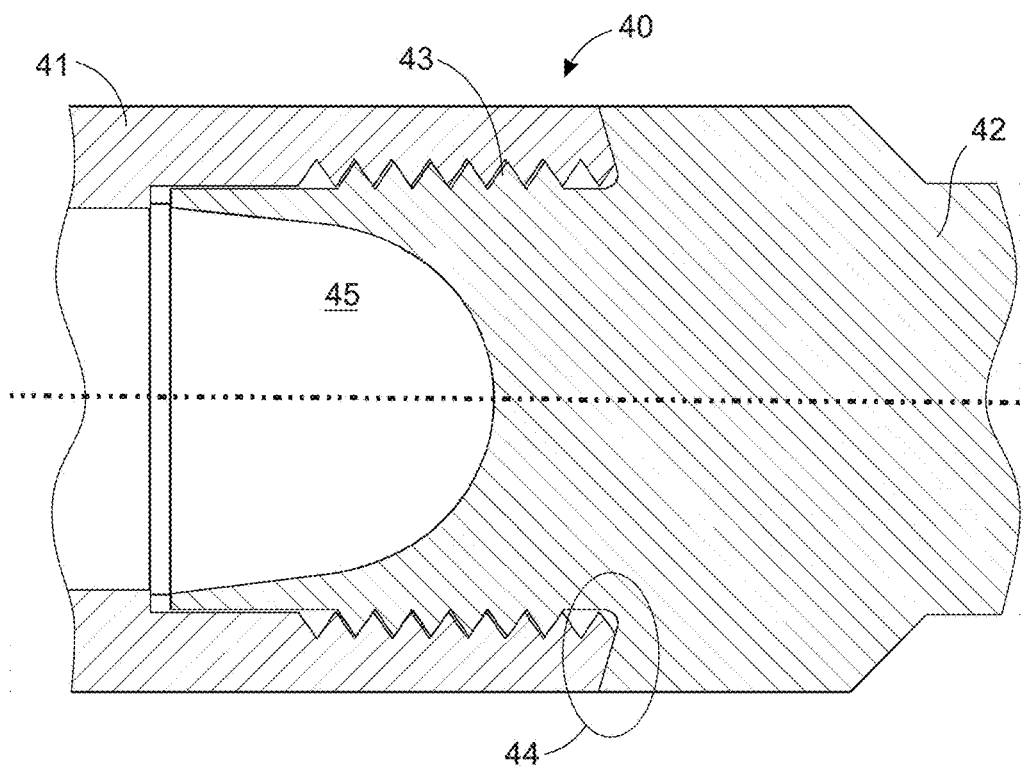
FIG. 6 shows a bonded-threaded hollow-solid shaft combination.

FIG. 6 shows yet another embodiment of the bonded-threaded joint 40 according to the invention for high-speed rotors. In this case, the joint 40 is between a hollow shaft 41 without any insert and a solid shaft 42. A hollow shaft with no insert 41 is structurally equivalent to a hollow shaft with a weak insert. The thread 43 is applied to the hollow 41 and solid 42 shafts. Bonding is applied to this thread 43. The joint is also provided with the Inverse Conical Stopper 44 similar to those in FIG. 4 22 and FIG. 5 35.

The hollow shaft 41 does not have any support for the centrifugal load and therefore will swell at high rotation speeds. Inserting a solid shaft, like the one in FIG. 5, would mean an abrupt change in stiffness, resulting in a high load on the bond at the butt end of the solid shaft. Therefore, in addition to the Inverse Conical Stopper 44, this case also requires provisions to reduce the load on the bond at the end of the solid shaft (inside end of the bonded-threaded joint). To accomplish this, the end part of the solid shaft with a reduced cross section has been hollowed out with a cavity 45 to gradually reduce its stiffness.

It needs to be emphasized that various bonding methods can be applied in the joint 40 in FIG. 6 (gluing, brazing, etc.).

Figure 7:
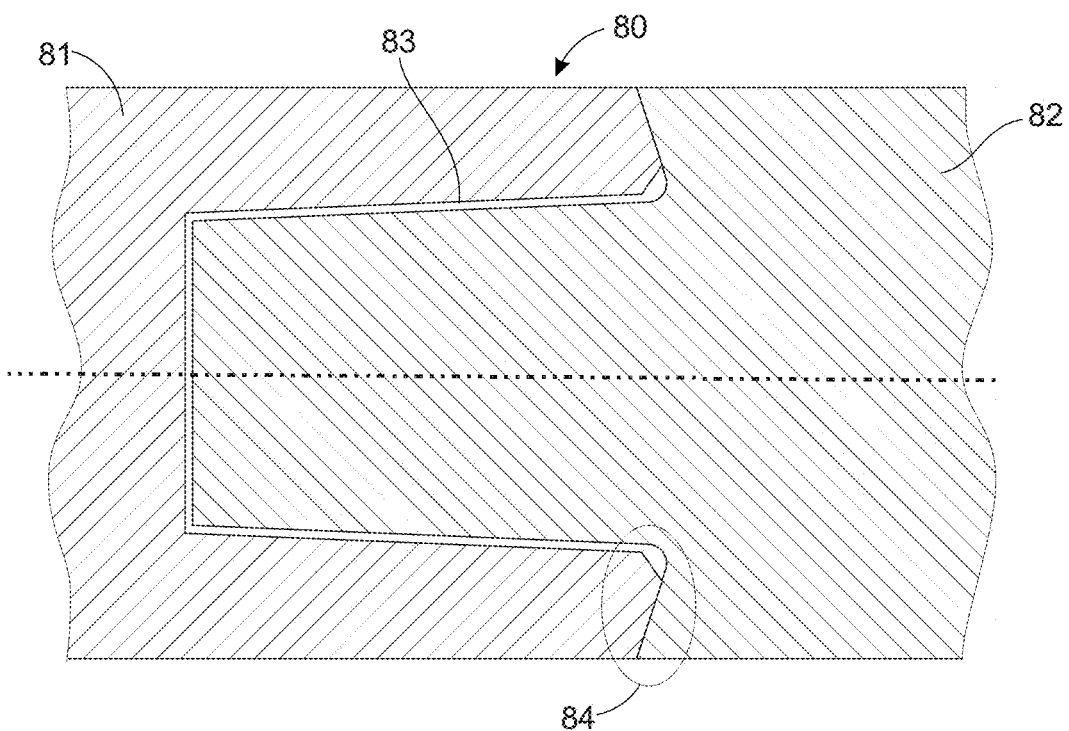
FIG. 7 shows a shaft combination with a conical shaft-to-shaft interface surface.

FIG. 7 shows yet another embodiment of the shaft joint 80 according to the invention. Herein, the joint is between the shafts 81 and 82. The interface 83 between the shafts has conical surface. The joint is provided with the Inverse Conical Stopper 84 according to the invention.

Figure 8:
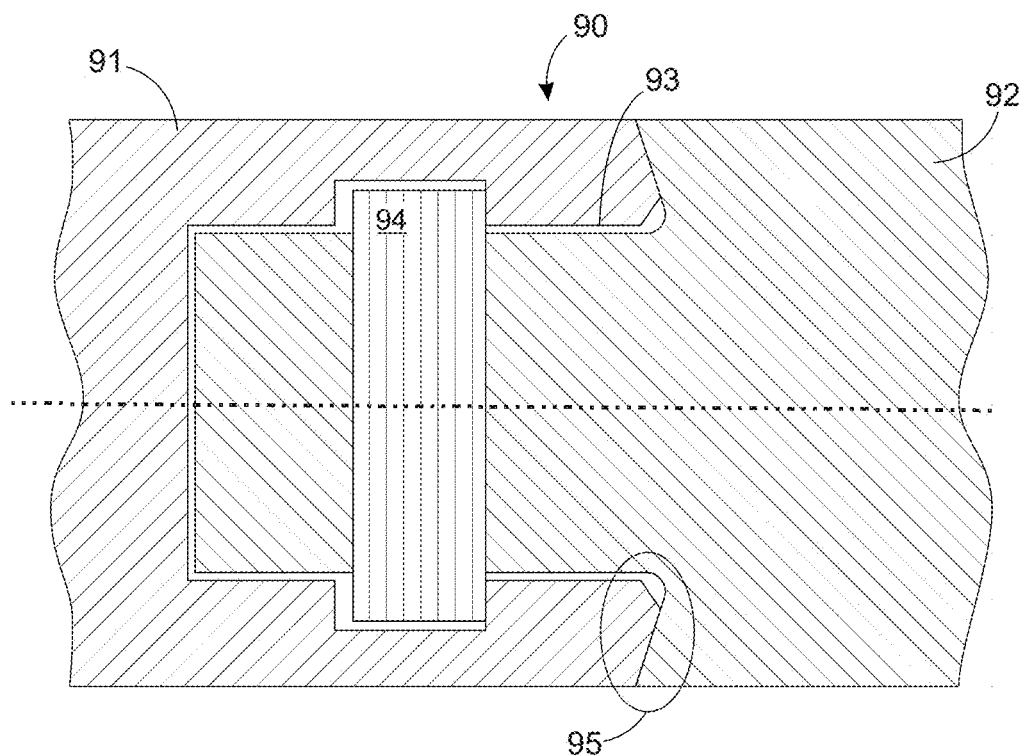
FIG. 8 shows a shaft combination with a lock.

FIG. 8 shows one more embodiment of the shaft joint 90 according to the invention. The two joined shafts are 91 and 92. The interface 93 between the shafts is provided with a lock 94. This lock can be of the bayonet type or of any other known type. The joint is also provided with the Inverse Conical Stopper 95 according to the invention.

Figure 9:
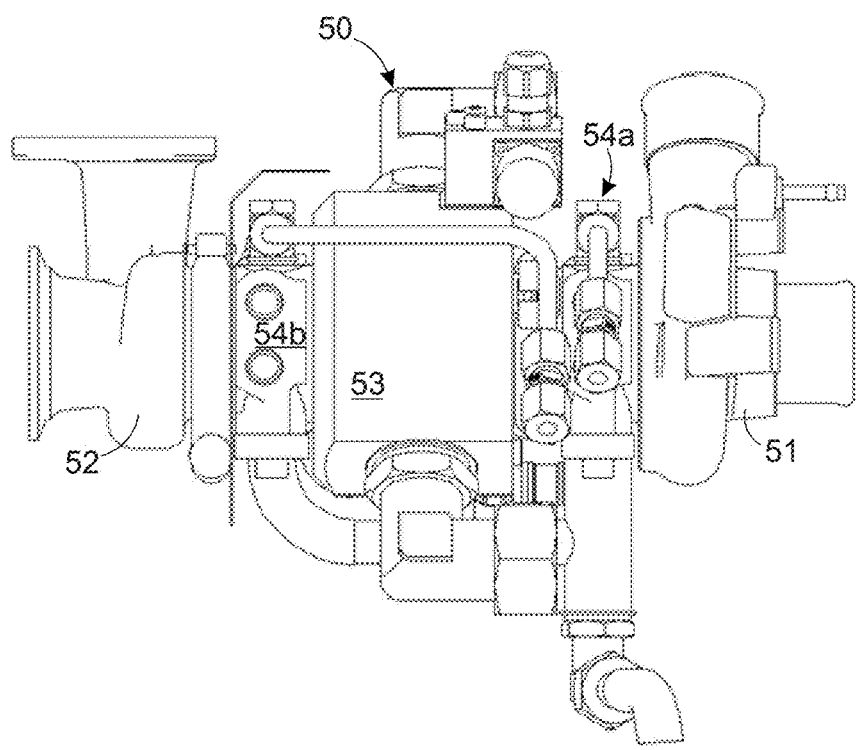
FIG. 9 shows a micro-turbine based turbogenerator with a rotor incorporating the bonded-threaded combination of shafts.

FIG. 9 shows the embodiment of a micro-turbine based turbogenerator 50 with a rotor incorporating a joint according to the invention. Among other components, the turbogenerator consists of a compressor 51, turbine 52, generator 53 and two bearing units 54a and 54b. The generator 53 can also be used as a start-up motor. The embodiment in FIG. 9 applies, yet does not limit the application, to a 3-4 kWe turbogenerator with the rotor speed of 200-250 kRPM.

Figure 10:
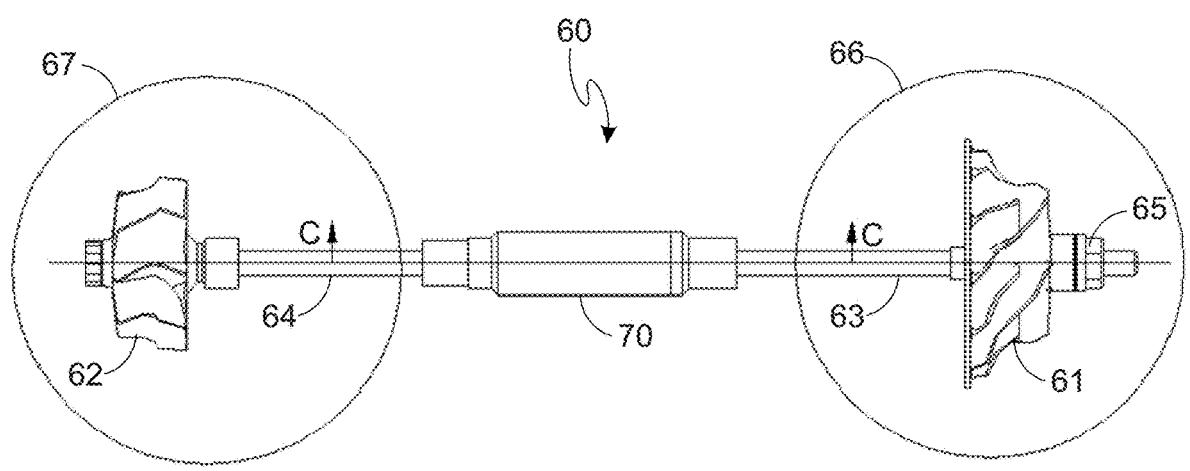
FIG. 10 shows a composed rotor of the micro-turbine based turbogenerator incorporating the bonded-threaded combination of shafts.

The rotor 60 of the turbogenerator 50 is shown in FIG. 10. Among other components, it consists of a compressor impeller 61, turbine impeller 62, compressor shaft 63, turbine shaft 64 and generator rotor 70. The turbine impeller 62 and shaft 64 are permanently connected—by welding, for example. The compressor impeller 61 is screwed onto the compressor shaft 63 and locked in place with a locking nut 65.

The compressor impeller 61, compressor shaft 63 and possibly other rotating components related to bearings, seals, etc. form the compressor rotor 66. The turbine impeller 62, turbine shaft 64 and possibly other rotating components related to bearings, seals, etc. form the turbine rotor 67.

The compressor rotor 66, turbine rotor 67 and generator rotor 70 are connected into a composed rotor 60.

Figure 11:
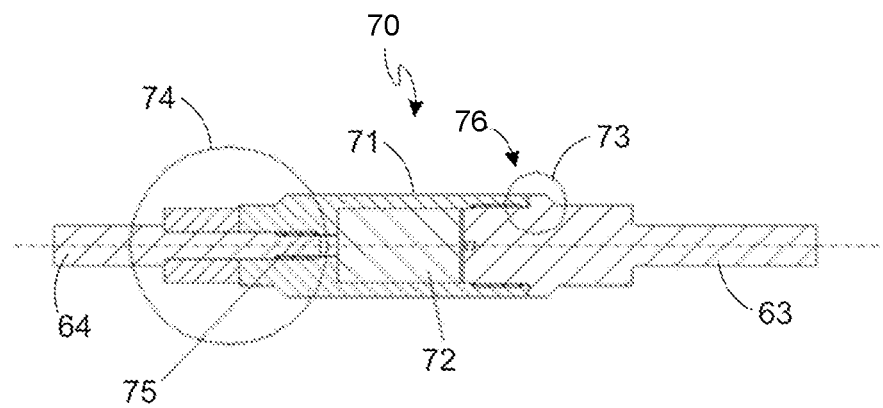
FIG. 11 shows a generator rotor of the composed rotor.

The generator rotor 70 is shown in detail in FIG. 11. It consists of a hollow sleeve 71 and a glued-in solid permanent-magnet insert 72. The hollow sleeve 71 is connected to the solid compressor shaft 63 via the glued-threaded joint according to the invention. An embodiment of this joint is magnified in the detail 76 in FIG. 11. Herein, the thread is applied to the sleeve 71 and the compressor shaft 63. A glue is applied to this thread. The joint is also provided with the Inverse Conical Stopper 73 according to the invention, as described above and detailed in FIG. 4-FIG. 8 under numerals 22, 35, 44, 84 and 95.

The turbine shaft 64 in the embodiments in FIG. 9-FIG. 11 is also solid. It is connected to the hollow sleeve 71 of the generator rotor 70 on the opposite end to the joint articulated by the detail 76 in FIG. 11. This joint 74 is a long threaded joint with the thread 75 applied to the turbine shaft and the sleeve. The joint 74 is also self-centering.

The composed rotor shown in the embodiments in FIG. 10 and FIG. 11 delivers the following critical advantages for application in micro-turbine based turbogenerators:

A solid-magnet generator rotor. It has a high ratio of magnet volume to the shaft diameter. This is important for high service speeds, since a large diameter would result in more material stress and may have considerable windage losses.

A joint that does not require high process temperatures to make, which are detrimental for the permanent magnet.

A composed high-speed rotor that resists radial swelling and has self-centering components.

A rotor suitable for the turbogenerator assembly and disassembly.

Floating-ring oil bearings that require smaller diameter shaft sections, which have to be connected to other large-diameter shaft sections in the application.

These advantages are also critical for connecting existing compressor, turbine, bearing and motor-generator modules into new configurations. By doing so, modules taken from different existing hardware are connected as to produce new hardware for new applications.

The advantages listed above can also benefit other applications: electrically assisted turbochargers, energy storage systems, tooling, etc.

Although the present invention is elucidated above on the basis of FIG. 1-11, it should be articulated that this invention is not limited whatsoever to the embodiments shown in these figures. The invention also extends to all embodiments deviating from the embodiments shown in the figures within the context defined by the description and the claims.

The invention claimed is:

1. A micro-turbine based turbogenerator comprising:
   a turbine shaft having a turbine impeller mounted thereupon;
   a compressor shaft having a compressor impeller mounted thereupon, the compressor shaft having an end part with a reduced cross section that is separated from the rest of the compressor shaft via a step;
   a generator rotor fixedly mounted on the turbine shaft, the generator rotor having a hollow sleeve formed opposite the turbine shaft for receiving the reduced cross section of the end part of the compressor shaft;
   wherein the step of the compressor shaft has a surface that forms an inverse conical shape; and
   wherein the hollow sleeve of the generator rotor has a butt end with an end surface which abuts the surface of the step of the compressor shaft at an incline relative to a centreline of the compressor shaft and the turbine shafts to prevent expansion of the hollow sleeve of the generator rotor during rotation of the compressor shaft and the turbine shafts.

2. The micro-turbine based turbogenerator of claim 1, wherein the end surface of the butt end of the hollow sleeve of the generator rotor and the surface of the step of the compressor shaft are smooth surfaces.

3. The micro-turbine based turbogenerator of claim 1, further comprising glue between the hollow sleeve of the generator rotor and the end part of the compressor shaft.

4. The micro-turbine based turbogenerator of claim 1, further comprising a magnet positioned within the hollow sleeve of the generator rotor between the compressor shaft and the end part of the turbine shaft.

5. The micro-turbine based turbogenerator of claim 1, wherein the compressor impeller is mounted upon the compressor shaft and locked in place with a locking nut.

6. The micro-turbine based turbogenerator of claim 1, wherein the generator rotor is connected to the compressor shaft by means of a glue threaded joint.

7. The micro-turbine based turbogenerator of claim 1, further comprising a lock formed between the turbine shaft and the compressor shaft.

8. A micro-turbine based turbogenerator comprising:
   a turbine shaft having, a turbine impeller mounted thereupon;
   a compressor shaft having a compressor impeller mounted thereupon, the compressor shaft having an end part with a reduced cross section that is separated from the rest of the compressor shaft via a step;
   a generator rotor fixedly mounted on the turbine shaft, the generator rotor having a hollow sleeve formed opposite the turbine shaft for receiving the reduced cross section of the end part of the compressor shaft;
   wherein the step of the compressor shaft has a surface that forms an inverse conical shape;
   wherein the hollow sleeve of the generator rotor has a butt end with an end surface which abuts the surface of the step of the compressor shaft at an incline relative to a centreline of the compressor shaft and the turbine shafts to prevent expansion of the hollow sleeve of the generator rotor during rotation of the compressor shaft and the turbine shafts; and
   wherein the micro-turbine based turbogenerator further comprises a magnet positioned within the hollow sleeve of the generator rotor between the compressor shaft and the end part of the turbine shaft.

9. The micro-turbine based turbogenerator of claim 8, wherein the compressor impeller is mounted upon the compressor shaft and locked in place with a locking nut.

10. The micro-turbine based turbogenerator of claim 8, wherein the generator rotor is connected to the compressor shaft by means of a glue threaded joint.

11. The micro-turbine based turbogenerator of claim 8, further comprising a lock formed between the turbine shaft and the compressor shaft.

\* \* \* \* \*